United States Patent
Howell et al.

(10) Patent No.: US 6,735,950 B1
(45) Date of Patent: May 18, 2004

(54) COMBUSTOR DOME PLATE AND METHOD OF MAKING THE SAME

(75) Inventors: Stephen J. Howell, Georgetown, MA (US); Jennifer Waslo, Marblehead, MA (US); Robert G. Carita, Needham, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/540,565

(22) Filed: Mar. 31, 2000

(51) Int. Cl.⁷ .............................. F23R 3/10; F23R 3/14
(52) U.S. Cl. ........................ 60/748; 29/890.02; 60/756
(58) Field of Search ........................... 60/39.36, 748, 60/752, 756, 757; 29/889.2, 890.01, 890.02

(56) References Cited

U.S. PATENT DOCUMENTS

| | | | | |
|---|---|---|---|---|
| 3,724,207 A | * | 4/1973 | Johnson | 60/756 |
| 4,365,470 A | * | 12/1982 | Matthews et al. | 60/756 |
| 4,686,823 A | * | 8/1987 | Coburn et al. | 60/752 |
| 4,916,905 A | * | 4/1990 | Havercroft et al. | 60/756 |
| 4,995,949 A | * | 2/1991 | Rhoades | 204/15 |
| 5,117,637 A | | 6/1992 | Howell et al. | 60/748 |
| 5,142,871 A | * | 9/1992 | Lampes et al. | 60/756 |
| 5,307,637 A | * | 5/1994 | Stickles et al. | 60/756 |
| 5,329,761 A | * | 7/1994 | Ablett et al. | 60/39.36 |
| 5,664,412 A | * | 9/1997 | Overton | 60/748 |
| 5,688,104 A | * | 11/1997 | Beabout | 415/115 |
| 5,893,984 A | * | 4/1999 | Thompson | 219/69.15 |
| 6,035,645 A | * | 3/2000 | Bensaadi et al. | 60/748 |
| 6,155,056 A | * | 12/2000 | Sampath et al. | 60/756 |
| 6,412,272 B1 | * | 7/2002 | Titterton et al. | 60/39.37 |

OTHER PUBLICATIONS

U.S. patent application Ser. No. 09/482,666, filed Jan. 13, 2000.

* cited by examiner

*Primary Examiner*—Ted Kim
(74) *Attorney, Agent, or Firm*—William Scott Andes; Pierce Atwood

(57) ABSTRACT

A method of making a dome plate for a gas turbine engine combustor includes forming an annular body and forming a plurality of swirler openings in the annular body. Then, an array of impingement cooling holes and an array of blow-off holes are electrically discharge machined into the annular body adjacent to each swirler opening. For each one of the plurality of swirler openings, the corresponding array of impingement cooling holes and the corresponding array of blow-off holes are machined in a single electrical discharge machining operation. This results in an annular dome plate having radially outer and inner curved corners that define a single radius of curvature. The blow-off holes are located in at least one of the outer and inner curved corners.

4 Claims, 2 Drawing Sheets

COMBUSTOR DOME PLATE AND METHOD OF MAKING THE SAME

BACKGROUND OF THE INVENTION

This invention relates generally to gas turbine engines and more particularly to combustor dome plates used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners to protect the surrounding engine components from the intense heat generated by the combustion process. The combustor liners are joined at their upstream ends to a dome assembly. The dome assembly includes an annular dome plate and a plurality of circumferentially spaced swirler assemblies mounted therein for introducing the fuel/air mixture to the combustion chamber.

One conventional dome assembly includes a dome plate having a plurality of openings, referred to herein as eyelets, formed therein for receiving the swirler assemblies. The dome assembly further includes a baffle extending downstream from each swirler assembly for shielding the dome plate from the hot combustion gases of the combustion chamber. The baffles are thus subject to intense heat and must be cooled to extend the life thereof. Baffle cooling is accomplished by impingement-type cooling holes formed in the dome plate so as to cause compressed air to impinge against the upstream side of the baffles. This impingement air subsequently "spills off" the baffles and flows downstream so as to cool the outer and inner liners. However, impingement air tends not to "spill off" in the gaps formed between adjacent baffles. Thus, additional cooling holes, typically referred to as blow-off holes, are formed in the dome plate in locations aligned with the baffle gaps. The blow-off holes thus direct air flow onto the areas of the inner liner that are circumferentially aligned with the baffle gaps, areas that would otherwise not be cooled because of the lack of impingement air spill off.

As used herein, the term "eyelet" refers to particularly shaped opening formed in a dome plate. A dome plate having such an eyelet is shown in FIG. 6 of U.S. Pat. No. 5,117,637 issued Jun. 2, 1992 to Stephen J. Howell et al. As can be seen in the Howell et al. patent, two characteristics of an eyeletted dome plate are that the corners between the eyelets and the outer and inner edges of the dome plate define sharp, compound radii, and the circumference of each eyelet defines an axially facing lip.

While eyeletted dome plates generally provided excellent performance, they do tend to be relatively expensive to manufacture. For example, because of the sharp compound radii corners that result from formed eyelets, the blow-off holes must be accurately positioned with respect to the inner liner. Otherwise, the cooling air flow issued from the blow-off holes will jet into and disrupt the main gas flow in the combustor instead of attaching to the liner wall. To ensure accurate positioning, the blow-off holes have to be machined separately from the impingement cooling holes. Separate hole machining operations require separate fixtures and set-ups, thereby generally increasing the cost of manufacturing the dome plate.

Furthermore, the axially facing lip on eyeletted dome plates must undergo a length trimming operation before the dome assembly can be fully assembled. This requirement further increases the cost of producing the dome plate.

Accordingly, there is a need for a low cost dome plate that retains the excellent performance of known dome plates and a method for making such a dome plate.

BRIEF SUMMARY OF THE INVENTION

The above-mentioned need is met by the present invention which provides a method of making a dome plate. The method includes forming an annular body and forming a plurality of swirler openings in the annular body. Then, an array of impingement cooling holes and an array of blow-off holes are electrically discharge machined into the annular body adjacent to each swirler opening. For each one of the plurality of swirler openings, the corresponding array of impingement cooling holes and the corresponding array of blow-off holes are machined in a single electrical discharge machining operation. This results in an annular dome plate having radially outer and inner curved corners that define a single radius of curvature. The blow-off holes are located in at least one of the outer and inner curved corners.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
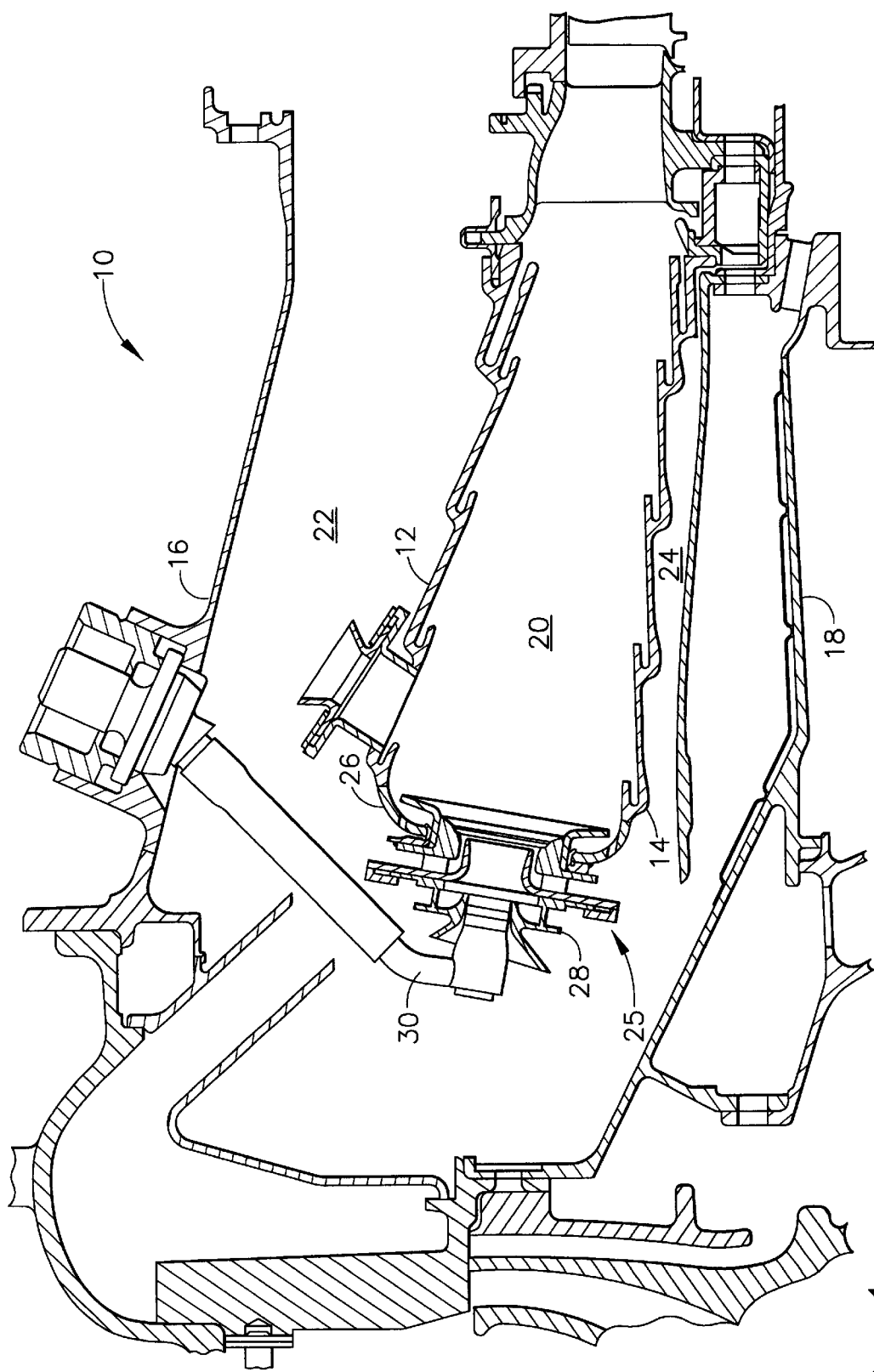
FIG. 1 is a longitudinal sectional view of a gas turbine combustor having the dome plate of the present invention.

Referring to the drawings wherein identical reference numerals denote the same elements throughout the various views, FIG. 1 shows an exemplary combustor 10 of the type suitable for use in a gas turbine engine having a centerline axis. The combustor 10 includes an outer liner 12 and an inner liner 14 disposed between an outer combustor casing 16 and an inner combustor casing 18. The outer and inner liners 12 and 14 are radially spaced from each other to define a combustion chamber 20. The outer liner 12 and the outer casing 16 form an outer passage 22 therebetween, and the inner liner 14 and the inner casing 18 form an inner passage 24 therebetween. As is known in the art, compressed air is supplied from a compressor (not shown) located upstream of the combustor 10. The compressed air passes principally into the combustor 10 to support combustion and partially into the outer and inner passages 22 and 24 where it is used to cool the liners 12 and 14 and turbomachinery further downstream.

Located between and interconnecting the outer and inner liners 12 and 14 near their upstream ends is a dome assembly 25 disposed coaxially about the engine's centerline axis. The dome assembly 25 includes an annular dome plate 26 and a plurality of circumferentially spaced swirler assemblies 28 (only one shown in FIG. 1) formed therein. Each swirler assembly 28 receives compressed air from the compressor and fuel from a corresponding fuel tube 30. The fuel and air are swirled and mixed by swirler assemblies 28, and the resulting fuel/air mixture is discharged into combustion chamber 20.

Figure 2:
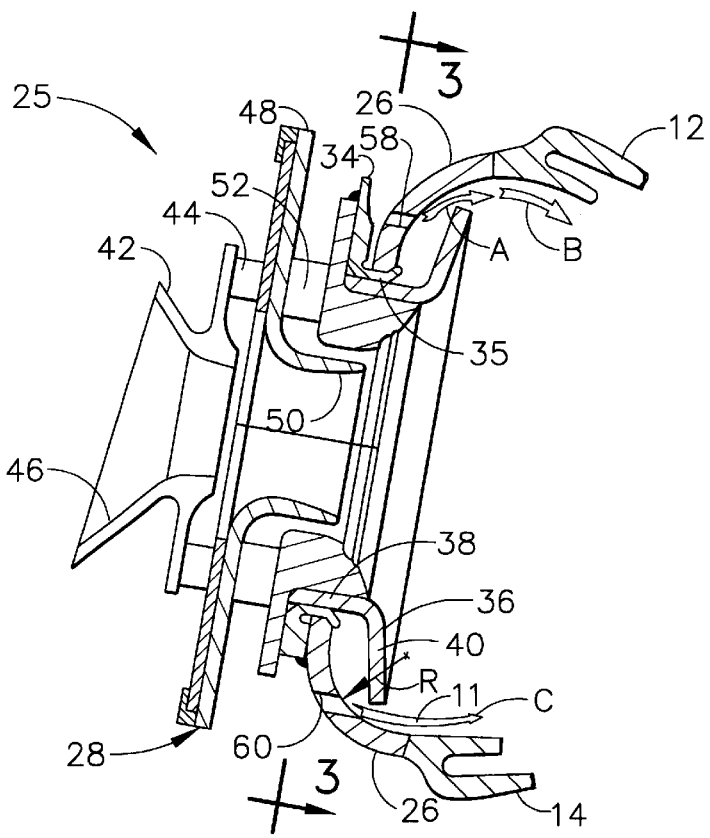
FIG. 2 is an enlarged sectional view of the forward portion of the combustor from FIG. 1, showing the dome plate in more detail.
Figure 3:
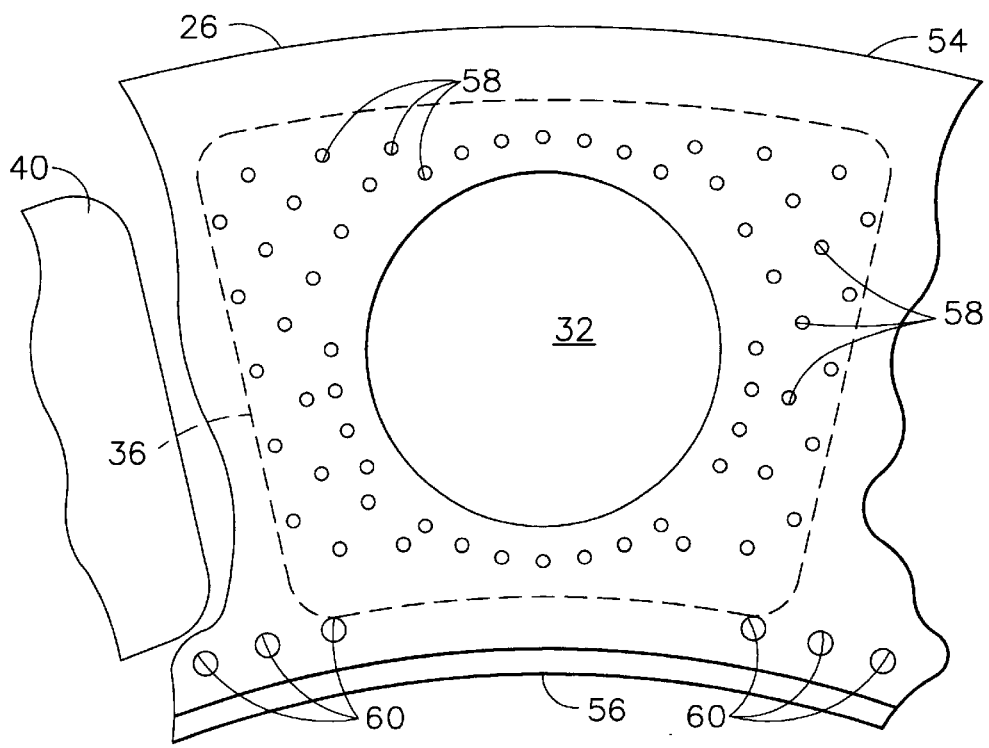
FIG. 3 is a fragmentary, forward-looking-aft end view of the dome plate of FIG. 2 with the swirler assembly removed, thereby showing the dome plate cooling pattern.

Referring to FIGS. 2 and 3, the dome assembly 25 is shown in more detail. The dome plate 26 includes a plurality of circumferentially spaced, round openings 32 (seen best in FIG. 3) formed therein for receiving the swirler assemblies 28. A seal plate 34 is fixedly joined to the dome plate 26 at each swirler opening 32 thereof. Each seal plate 34 comprises a substantially annular portion having an axially aft extending central ring 35. The seal plate 34 is mounted on the upstream or forward side of the dome plate 26, with the central ring 35 coaxially received within the respective opening 32. The seal plate 34 is preferably attached to the dome plate 26 via a swage joint between the central ring 35 and the dome plate 26. Specifically, the aft end of the central ring is bent by swaging so as to be splayed radially outward against the inside edge of the respective opening 32. The opening edge is preferably chamfered to provide sealing and air leakage control between the dome plate 26 and the corresponding swirler assembly 28.

A baffle 36 is disposed within each one of the seal plates 34. Each baffle 36 includes a tubular mounting portion 38 and an integrally formed flare portion 40. The tubular mounting portions 38 are disposed coaxially within the central ring 35 of the respective seal plates 34 such that the flare portions 40 are located downstream therefrom. The baffles 36 are preferably tack welded to the corresponding seal plate 34. As seen in FIG. 3, the flare portions 40 define a substantially rectangular shape with side edges in close juxtaposition with adjacent flare portions 40. The flare portions 40 thus shield the dome plate 26 from the hot combustion gases in the combustion chamber 20.

Each swirler assembly 28 includes a primary swirler 42 that comprises a plurality of angularly directed swirl vanes 44. The vanes 44 are angled with respect to the axial centerline of the swirler assembly 28 so as to impart a swirling motion to the air flow. The primary swirler 42 also has a ferrule 46 that coaxially receives the nozzle of the fuel tube 30. The swirler assembly 28 further includes a secondary swirler 48 that adjoins the primary swirler 42, downstream thereof. The secondary swirler 48 defines an outer cylindrical surface that is snugly received within the tubular mounting portion 38 of the baffle 36. The secondary swirler 48 is fixedly joined to the seal plate 34, such as by tack welds, so as to be fixed with respect to the dome plate 26. The tubular mounting portion 38 is thus sandwiched between the secondary swirler 48 and the central ring 35 of the seal plate 34.

The secondary swirler 48 includes a venturi 50 and a plurality of circumferentially spaced swirl vanes 52 disposed coaxially about the venturi 50. The venturi 50 and the ferrule 46 of the primary swirler 42 are both coaxially aligned with the axial centerline of the swirler assembly 28. Compressed air from the compressor passes through the vanes 44 and is swirled. The swirling air exiting the vanes 44 interacts with fuel injected from the fuel tube 30 so as to mix as it passes into the venturi 50. The secondary swirl vanes 52 then act to present a swirl of air swirling in the opposite direction that interacts with the fuel/air mixture so as to further atomize the mixture and prepare it for combustion in the combustion chamber 20.

The dome plate 26, which is preferably an inexpensive sheet metal stamping, is an annular member having an outer edge 54 and inner edge 56 that define substantially concentric circles. The swirler openings 32 are formed in a relatively flat portion of the dome plate 26, intermediate the outer and inner edges 54 and 56. The openings 32 are preferably formed by any technique that eliminates the lip and sharp compound radii of formed eyelets. Thus, the circumference of each opening 32 defines a radially facing surface that is flush with the relatively flat portion of the dome plate 26. The two regions of the dome plate 26 located radially between the openings 32 and the outer and inner edges 54 and 56, respectively, define curved corners creating a concave inner surface of radius R. Because the corners define a single radius of curvature, the radius R is can be larger than the sharp compound radii used in some conventional dome plates. The corners are curved in the downstream or aft direction such that the outer and inner edges 54 and 56 face axially downstream. With this orientation, the outer edge 54 is joined (by welding for example) to the forward edge of the outer liner 12, and the inner edge 56 is joined to the forward edge of the inner liner 14.

Conventional impingement-type cooling holes 58 are formed in the dome plate 26. The cooling holes 58 cause compressed air to impinge against the upstream side of the baffle 36 (represented in FIG. 2 by arrow A), thereby cooling the baffle 36. This impingement air subsequently "spills off" the outer and inner edges of the baffle 36 so as to cool the liners 12 and 14 (represented in FIG. 2 by arrow B). As best seen in FIG. 3, the cooling holes 58 are arranged in a number of arrays, with the cooling holes 58 of each array being grouped around a respective one of the openings 32.

However, because impingement air tends not to "spill off" the baffles 36 in the gaps formed between the side edges of adjacent baffle flare portions 40, these regions do not receive this source of cooling. Thus, a plurality of blow-off holes 60 is formed in the inner curved corner of the dome plate 26. As seen in FIG. 3, an array of three such blow-off holes 60 is situated in the dome plate 26 so as to be aligned with each gap formed between the side edges of adjacent baffle flare portions 40. Thus, each swirler opening 32 has one array of impingement cooling holes 58 and one array of blow-off holes 60 associated with it and located adjacent thereto. The blow-off holes 60 are positioned to blow off any fuel burning that occurs as result of flameholding between the baffles 36. Although each array is shown to contain three such blow-off holes 60, the present invention is not limited to this number.

Because of the large radius R of the curved corner, the positioning of the blow-off holes 60 is less sensitive in counteracting flameholding than is the case of blow-off holes used in a dome plate having a sharp compound radii. With the blow-off holes 60 located in the large curved corner, the air jets emitted therefrom, represented in FIG. 2 by arrow C, will attach to the wall of the inner liner 14, structuring the air flow and assisting in cooling the inner liner 14. This phenomenon enables the true position requirement of the blow-off holes 60 to be relaxed.

The dome plate 26 is preferably fabricated by first using a conventional sheet metal stamping method for forming a one-piece, annular body having the curved corners. Next, the swirler openings 32 are formed in the dome plate 26. As mentioned above, the openings 32 are formed by any technique, such as conventional mechanical drilling, punching or the like, that eliminates the lip and sharp compound radii that occur with formed eyelets. This not only eases the true position requirement of the blow-off holes 60, but also eliminates the additional length trimming operation required in some conventional combustors.

The cooling holes 58 and blow-off holes 60 are then formed using electrical discharge machining (EDM) techniques. Because their true position requirement is relaxed, the blow-off holes 60 can be machined at the same time and using the same fixture as the cooling holes 58. An EDM tool having a plurality of electrodes matching the cooling hole array and the blow-off hole array is used. That is, the EDM tool has a number of electrodes sized and arranged to machine an array of cooling holes 58 and a number of electrodes sized and arranged to machine an array of blow-off holes 60. Thus, hole machining operations can be performed continually without requiring additional setup operations. The ability to form impingement cooling holes and blow-off holes together in a single EDM operation greatly reduces the cost of producing the dome plate 26.

After its fabrication, the dome plate 26 is assembled to the combustor by joining the outer edge 54 to the forward edge of the outer liner 12 and the inner edge 56 to the forward edge of the inner liner 14.

The foregoing has described a low cost dome plate and the method of making such a dome plate. While specific embodiments of the present invention have been described, it will be apparent to those skilled in the art that various modifications thereto can be made without departing from the spirit and scope of the invention as defined in the appended claims.

What is claimed is:

1. A method of making a dome plate for a gas turbine engine combustor which defines a combustion chamber, said method comprising the steps of:

forming an annular body, including providing said annular body with a relatively flat portion extending between a pair of curved corners, each corner defining a single radius of curvature so as to create an inner surface which is concave with respect to said combustion chamber;

forming a plurality of swirler openings in said relatively flat portion of said annular body, wherein the portions of said annular body immediately surrounding said swirler openings are flush with the remainder of said relatively flat portion of said body;

machining an array of cooling holes in said relatively flat portion of said annular body adjacent to each of said swirler openings; and machining an array of blow-off holes in at least one of said outer and inner curved corners, said blow-off holes being arranged in distinct groups around the circumference of said annular body, wherein said groups are located circumferentially between adjacent ones of said swirler openings and wherein said groups have a circumferential extent which is less than the circumferential spacing between said groups.

2. The method of claim 1 wherein said step of forming an annular body includes a sheet metal stamping method.

3. A dome plate for a gas turbine engine combustor which defines a combustion chamber, said dome plate comprising:

an annular body having a relatively flat portion extending between radially outer and inner curved corners, said curved corners each defining a single radius of curvature so as to create an inner surface which is concave with respect to said combustion chamber;

a plurality of swirler openings formed in said relatively flat portion of annular body, wherein the portions of said body immediately surrounding said swirler openings are flush with the remainder of said relatively flat portion of said body;

an array of cooling holes formed in said relatively flat portion of said annular body adjacent to each one of said plurality of swirler openings; and an array of blow-off holes formed in at least one of said outer and inner curved corners, said blow-off holes being arranged in distinct groups around the circumference of said annular body, wherein said groups are located circumferentially between adjacent ones of said swirler openings, and wherein said groups have a circumferential extent which is less than the circumferential spacing between said groups.

4. The dome plate of claim 3 wherein, for each one of said plurality of swirler openings, the corresponding array of impingement cooling holes and the corresponding array of blow-off holes are oriented relative to one another so that they can be machined in a single electrical discharge machining operation.

* * * * *